United States Patent
Sun et al.

(10) Patent No.: US 11,898,613 B2
(45) Date of Patent: Feb. 13, 2024

(54) METHOD FOR REPAIRING DAMAGE ON NON-FRICTION SURFACE OF CARBON BRAKE DISC OF AIRCRAFT

(71) Applicant: SHANGHAI HANGYI RESEARCH INSTITUTE OF HIGH-TECH DEVELOPMENT CO., LTD., Shanghai (CN)

(72) Inventors: Tao Sun, Shanghai (CN); Hao Tang, Shanghai (CN); Jun Wang, Shanghai (CN)

(73) Assignee: SHANGHAI HANGYI RESEARCH INSTITUTE OF HIGH-TECH DEVELOPMENT CO., LTD., Shanghai (CN)

( * ) Notice: Subject to any disclaimer, the term of this patent is extended or adjusted under 35 U.S.C. 154(b) by 390 days.

(21) Appl. No.: 17/448,526

(22) Filed: Sep. 23, 2021

(65) Prior Publication Data
US 2022/0403899 A1   Dec. 22, 2022

(30) Foreign Application Priority Data
Jun. 22, 2021 (CN) .......................... 202110691295.1

(51) Int. Cl.
| | |
|---|---|
| *F16D 65/00* | (2006.01) |
| *C04B 14/30* | (2006.01) |
| *C04B 14/32* | (2006.01) |
| *C04B 22/06* | (2006.01) |
| *C04B 28/26* | (2006.01) |

(52) U.S. Cl.
CPC ........ *F16D 65/0043* (2013.01); *C04B 14/303* (2013.01); *C04B 14/305* (2013.01); *C04B 14/321* (2013.01); *C04B 22/06* (2013.01); *C04B 28/26* (2013.01); *F16D 2250/0069* (2013.01)

(58) Field of Classification Search
CPC .............................. F16D 65/12; F16D 65/0043
See application file for complete search history.

(56) References Cited

U.S. PATENT DOCUMENTS

| | | | | |
|---|---|---|---|---|
| 4,742,948 A | * | 5/1988 | Fisher | F16D 69/0408 228/119 |
| 2003/0145447 A1 | * | 8/2003 | Moseley | C09K 5/063 29/458 |
| 2006/0057289 A1 | * | 3/2006 | Simpson | B05D 1/18 427/256 |
| 2010/0129551 A1 | * | 5/2010 | Fryska | C04B 35/83 427/256 |
| 2021/0261474 A1 | * | 8/2021 | Jadidian | C04B 35/83 |

* cited by examiner

*Primary Examiner* — Scott W Dodds
(74) *Attorney, Agent, or Firm* — Bayramoglu Law Offices LLC

(57) ABSTRACT

A method for repairing damage on a non-friction surface of a carbon brake disc of an aircraft, includes: removal of a damaged region, cutting of a repair material, anti-oxidation modification of the repair material, bonding and curing, and high-temperature heat treatment. The anti-oxidation modification is performed on the repair material without affecting the mechanical properties of the repair material, which improves the anti-oxidation ability of the repair zone and avoids the preparation of an anti-oxidation coating. In this way, only the damage on the non-friction surface is repaired, and there is little effect on the mechanical properties, friction and wear properties and thermal conductivity of the carbon-carbon composite material.

10 Claims, No Drawings

METHOD FOR REPAIRING DAMAGE ON NON-FRICTION SURFACE OF CARBON BRAKE DISC OF AIRCRAFT

CROSS REFERENCE TO THE RELATED APPLICATIONS

This application is based upon and claims priority to Chinese Patent Application No. 202110691295.1, filed on Jun. 22, 2021, the entire contents of which are incorporated herein by reference.

TECHNICAL FIELD

The present invention relates to a method for repairing damage on a non-friction surface of a carbon brake disc of an aircraft, and belongs to the technical field of material repair.

BACKGROUND

The carbon-carbon composite material is commonly used in brake discs of aircrafts due to its unique high-temperature friction properties. Improper maintenance and collision with foreign objects may cause a damage failure of a non-friction surface of a carbon brake disc of an aircraft, such as cracking to the edge, falling off of blocks, degenerating of materials, and falling off of the oxide layer. Repairing the damage on the non-friction surface of the carbon brake disc of the aircraft can prevent excessive damage and expensive replacement of parts, and thus extend the maintenance cycle of the carbon brake disc.

The carbon matrix begins to oxidize at 370° C., and oxidizes rapidly above 500° C. The temperature of the carbon brake disc of an aircraft is generally below 700° C. when the aircraft is in a normal landing and can reach 1000° C. instantly under extreme conditions, such as the suspension of take-off. Therefore, the carbon brake disc must have high thermal shock resistance and high oxidation resistance. After the carbon brake disc is damaged, the oxidizing gas can easily oxidize in the repaired region of the carbon brake disc. After pores are formed on the surface, the oxidizing gas will penetrate into the interior of the structure and continue to react with carbon, causing the dense structure to become loose and the mechanical properties to decrease rapidly. Therefore, it is very necessary to protect the repaired carbon brake disc from oxidation.

Chinese patent application CN202010029059.9 disclosed a method for repairing a carbon-carbon composite material. It includes the following steps: step 1: checking a degree of damage of a product under natural light, where the light can be artificially supplemented to be sufficient as needed; step 2: preparing an adhesive; step 3: processing the surface of a repair zone; step 4: selecting and cutting a reinforcement material; step 5: applying the adhesive for repairing; step 6: curing; step 7: polishing the surface; step 8: carbonization treatment; step 9: high-temperature purification treatment; and step 10: inspecting the finished product. This method omits the anti-oxidation treatment of the repair zone, so the repaired carbon-carbon composite material is prone to oxidize and fail when used at high temperatures.

Chinese patent application CN201410034500.7 disclosed a repair method for a surface defect of a rhenium-iridium coating for oxidation resistance of a carbon-carbon composite material. The repair method includes: infiltrating and applying a saturated soluble cobalt salt solution on the carbon-carbon composite material with a rhenium coating to generate a cobalt compound layer; subjecting the cobalt compound layer to hydrogen reduction to generate a cobalt layer, subjecting the obtained carbon-carbon composite material with a cobalt layer and a rhenium coating to high-temperature treatment in an Ar atmosphere, where the cobalt is melted to compensate the surface defect of the rhenium coating and cured together with rhenium to generate a rhenium-cobalt alloy coating; depositing a rhenium coating on the rhenium-cobalt alloy coating, and then depositing an iridium coating on the rhenium coating to obtain a carbon-carbon composite material with a repaired rhenium-iridium coating.

SUMMARY

The technical problem to be solved by the present invention is that the existing general repair method has poor stability and poor repair effect. In view of this, the present invention provides a method for repairing damage on a non-friction surface of a carbon brake disc of an aircraft.

In order to solve the above technical problem, the present invention provides a method for repairing damage on a non-friction surface of a carbon brake disc of an aircraft. The method includes the following steps:

step 1): removal of the damaged region: visually inspecting the damage on the non-friction surface of the carbon brake disc, determining a damage removal area, and marking the damage removal area, wherein the damage removal area is wider than an edge of the damaged region, the removal area is round or elliptical, and a maximum removal depth is a maximum depth of the damage; after the damage removal area is marked, polishing the damage removal area into a slope shape by using a polishing tool; machining glue-flowing grooves on a polished surface; placing the polished damaged carbon brake disc in an ultrasonic cleaner for cleaning, and then transferring the polished damaged carbon brake disc into a vacuum drying oven for drying;

step 2): cutting of a repair material: obtaining the repair material with a volume larger than the damage removal area of the carbon brake disc to be repaired by cutting a scrap carbon brake disc through mechanical processing; polishing the repair material until the repair material is equivalent to the damage removal area; machining glue-flowing grooves on a bonding surface of the repair material; placing the repair material after being polished in the ultrasonic cleaner for cleaning, and then transferring the repair material into the vacuum drying oven for drying;

step 3): anti-oxidation modification of the repair material:

step 3.1): mixing and stirring evenly $Al_2O_3$, $B_2O_3$, $TiO_2$ and $ZrB_2$ powders;

step 3.2): adding lithium tetraborate to a sodium silicate aqueous solution, and stirring to obtain a stable solution; then adding the mixed powders obtained in step 3.1), and stirring well to obtain a modifying solution;

step 3.3): pouring the modifying solution obtained in step 3.2) into an impregnating tank, completely impregnating the repair material in the modifying solution, and then vacuumizing for vacuum impregnation; and step 3.4): drying the impregnated repair material, and then curing in an oven at 80-120° C. for 2-4 h;

step 4): bonding and curing: applying an adhesive to the non-friction surface of the carbon brake disc to be repaired and the bonding surface of the repair material, and bonding the repair material to the damage removal area; clamping by using a clamp, and removing a spilled excess of the adhesive; putting the carbon brake disc with the repair material into the oven for curing; then removing a vacuum bag after curing, and polishing and smoothing a repair zone; and step 5): heat treatment: placing the carbon brake disc obtained in step 4) into a pre-vacuumized pyrolysis furnace protected by being filled with $N_2$ for heating and heat preservation, and then cooling to room temperature with the furnace to obtain a repaired carbon brake disc.

Preferably, in step 1), a slope of the slope shape is 1:15 to 1:20.

Preferably, in step 3.1), before mixing, the $Al_2O_3$, $B_2O_3$, $TiO_2$ and $ZrB_2$ powders are respectively milled in a ball mill for 12 h, then sieved through a 325-mesh sieve, and dried in the oven at 120° C. for 6 h.

Preferably, in step 3.1), the $Al_2O_3$, $B_2O_3$, $TiO_2$ and $ZrB_2$ powders have a weight ratio of 1:1.2:0.8:0.5.

Preferably, in step 3.2), a mass of the added lithium tetraborate is 1-6% of a mass of the sodium silicate aqueous solution, and a mass of the added mixed powders are 10% of the mass of the sodium silicate aqueous solution; the sodium silicate aqueous solution has a modulus of 2.8-3.2.

Preferably, in step 3.3), the vacuum impregnation is carried out under 40-60 kPa for 1-4 h.

Preferably, in step 4), the adhesive is prepared as follows: mixing a resin in an organic solvent; then adding an inorganic filler, a catalyst and a curing agent; and stirring to obtain the adhesive.

Preferably, the resin is at least one selected from the group consisting of an organic silicone resin and an epoxy resin; the inorganic filler is at least one selected from the group consisting of aluminum, boron carbide and glass powder.

Preferably, in step 4), the curing is carried out by heating to 120-160° C. at 5° C./min and performing heat preservation for 3 h.

Preferably, in step 5), the heat treatment in the pyrolysis furnace is carried out by heating to 700° C. and performing heat preservation for 2 h.

Compared with the prior art, the present invention has the following advantages. The present invention carries out the anti-oxidation modification of the repair material to improve the anti-oxidation ability of the repair zone without affecting the mechanical properties of the repair material. The present invention carries out the anti-oxidation treatment on the matrix of the repair material in advance, which improves the repair efficiency. By modifying the matrix of the repair material, the present invention avoids a series of problems caused by the preparation of an anti-oxidation coating, such as long preparation time, complicated process, high cost, and mismatch of the thermal expansion coefficients between the anti-oxidation coating and the carbon-carbon composite material. The present invention only repairs the damage on the non-friction surface, and has little effect on the mechanical properties, friction and wear properties and thermal conductivity of the carbon-carbon composite material.

The present invention adopts a cut and repair method, that is, the present invention uses a scrap carbon brake disc as a repair material to repair the damage on the non-friction surface of the carbon brake disc of the aircraft. Meanwhile, the present invention carries out the anti-oxidation modification of the repair material, which avoids the mismatch of the thermal expansion coefficients between the anti-oxidation coating and the carbon-carbon composite material, and improves the repair quality of the carbon brake disc.

DETAILED DESCRIPTION OF THE EMBODIMENTS

In order to make the present invention more understandable, preferred embodiments are described in detail as follows.

Embodiment 1

A method for repairing a damage on a non-friction surface of a carbon brake disc of an aircraft includes five steps, namely removal of a damaged region, cutting of a repair material, anti-oxidation modification of the repair material, bonding and curing, and high-temperature heat treatment. The specific process steps are as follows:

(1) Removal of the damaged region: visually inspecting the damage on the non-friction surface of the carbon brake disc, determining a damage removal area, and marking the damage removal area, where the damage removal area is wider than the edge of the damaged region, the removal area is round or elliptical, and the maximum removal depth is the maximum depth of the damage; after the damage removal area is marked, polishing the damage removal area into a slope shape with a slope of 1:15 to 1:20 by using a polishing tool; machining glue-flowing grooves on a polished surface; placing the polished damaged carbon brake disc in an ultrasonic cleaner for cleaning, and then transferring the polished damaged carbon brake disc into a vacuum drying oven for drying.

(2) Cutting of the repair material: obtaining the repair material with a volume larger than the damage removal area of the carbon brake disc to be repaired by cutting a scrap carbon brake disc through mechanical processing; polishing the repair material until the repair material is equivalent to the damage removal area; machining glue-flowing grooves on a bonding surface of the repair material; placing the repair material after being polished in the ultrasonic cleaner for cleaning, and then transferring the repair material into the vacuum drying oven for drying.

(3) Anti-oxidation modification of the repair material:

① Powder treatment: respectively milling $Al_2O_3$, $B_2O_3$, $TiO_2$ and $ZrB_2$ powders in a ball mill for 12 h, then sieving through a 325-mesh sieve, and drying in an oven at 120° C. for 6 h to obtain processed powders; evenly stirring the processed powders in a ratio of 1:1.2:0.8:0.5 in a stirrer.

② Solution preparation: adding 1 wt % lithium tetraborate to a sodium silicate aqueous solution, and stirring at 1000 rpm for 4 h to obtain a stable solution; then adding 10 wt % of the mixed powders prepared in step ①, and stirring well to obtain a modifying solution.

③ Impregnation: pouring the modifying solution obtained in step ② into an impregnating tank, completely impregnating the repair material in the modifying solution, then vacuumizing to 40 kPa, and impregnating for 4 h.

④ Curing: drying the impregnated repair material, and then curing in the oven at 80° C. for 4 h.

(4): Bonding and curing: applying a prepared adhesive to the carbon brake disc to be repaired and the bonding surface of the repair material, and bonding the repair material to the damage removal area; clamping by using a clamp, and removing a spilled excess of the adhesive; putting the carbon brake disc with the repair material into the oven for curing by heating to 250° C. at 5° C./min and performing heat preservation for 3 h; then removing the clamp after curing, and polishing and smoothing the repair zone.

(5) High-temperature heat treatment: placing the carbon brake disc to be repaired after being treated in step (4) into a pre-vacuumized pyrolysis furnace protected by being filled with $N_2$, heating the carbon brake disc to 500° C. and performing heat preservation for 4 h, and then cooling to room temperature with the furnace to obtain a repaired carbon brake disc.

Embodiment 2

A method for repairing a damage on a non-friction surface of a carbon brake disc of an aircraft includes five steps, namely removal of a damaged region, cutting of a repair material, anti-oxidation modification of the repair material, bonding and curing, and high-temperature heat treatment. The specific process steps are as follows:

(1) Removal of the damaged region: visually inspecting the damage on the non-friction surface of the carbon brake disc, determining a damage removal area, and marking the damage removal area, where the damage removal area is wider than the edge of the damaged region, the removal area is round or elliptical, and the maximum removal depth is the maximum depth of the damage; after the damage removal area is marked, polishing the damage removal area into a slope shape with a slope of 1:15 to 1:20 by using a polishing tool; machining glue-flowing grooves on a polished surface; placing the polished damaged carbon brake disc in an ultrasonic cleaner for cleaning, and then transferring the polished damaged carbon brake disc into a vacuum drying oven for drying.

(2) Cutting of the repair material: obtaining the repair material with a volume larger than the damage removal area of the carbon brake disc to be repaired by cutting a scrap carbon brake disc through mechanical processing; polishing the repair material until the repair material is equivalent to the damage removal area; machining glue-flowing grooves on a bonding surface of the repair material; placing the repair material after being polished in the ultrasonic cleaner for cleaning, and then transferring the repair material into the vacuum drying oven for drying.

(3) Anti-oxidation modification of the repair material:
① Powder treatment: respectively milling $Al_2O_3$, $B_2O_3$, $TiO_2$ and $ZrB_2$ powders in a ball mill for 12 h, then sieving through a 325-mesh sieve, and drying in an oven at 120° C. for 6 h to obtain processed powders; evenly stirring the processed powders in a ratio of 1:1.2:0.8:0.5 in a stirrer.
② Solution preparation: adding 6 wt % lithium tetraborate to a sodium silicate aqueous solution, and stirring at 1000 rpm for 4 h to obtain a stable solution; then adding 10 wt % of the mixed powders prepared in step ①, and stirring well to obtain a modifying solution.
③ Impregnation: pouring the modifying solution obtained in step ② into an impregnating tank, completely impregnating the repair material in the modifying solution, then vacuumizing to 60 kPa, and impregnating for 1 h.
④ Curing: drying the impregnated repair material, and then curing in the oven at 120° C. for 2 h.

(4): Bonding and curing: applying a prepared adhesive to the carbon brake disc to be repaired and the bonding surface of the repair material, and bonding the repair material to the damage removal area; clamping by using a clamp, and removing a spilled excess of the adhesive; putting the carbon brake disc with the repair material into the oven for curing by heating to 250° C. at 5° C./min and performing heat preservation for 3 h; then removing the clamp after curing, and polishing and smoothing the repair zone.

(5) High-temperature heat treatment: placing the carbon brake disc to be repaired after being treated in step (4) into a pre-vacuumized pyrolysis furnace protected by being filled with $N_2$, heating the carbon brake disc to 700° C. and performing heat preservation for 2 h, and then cooling to room temperature with the furnace to obtain a repaired carbon brake disc.

What is claimed is:

1. A method for repairing damage on a non-friction surface of a carbon brake disc of an aircraft, comprising the following steps:

step 1): removing a damaged region comprising: visually inspecting the damaged region on the non-friction surface of the carbon brake disc, determining a damage removal area, and marking the damage removal area, wherein the damage removal area is wider than an edge of the damaged region, the damage removal area is round or elliptical, and a maximum removal depth is a maximum depth of the damaged region; after the damage removal area is marked, polishing the damage removal area into a slope shape by using a polishing tool to obtain a polished damaged carbon brake disc; machining first glue-flowing grooves on a polished surface of the polished carbon brake disc; placing the polished damaged carbon brake disc in an ultrasonic cleaner for cleaning, and then transferring the polished damaged carbon brake disc into a vacuum drying oven for drying;

step 2): cutting of a repair material comprising: obtaining the repair material with a volume larger than the damage removal area by cutting a scrap carbon brake disc; polishing the repair material until the repair material is sized to the damage removal area; machining second glue-flowing grooves on a bonding surface of the repair material; placing the repair material after being polished in the ultrasonic cleaner for cleaning, and then transferring the repair material into the vacuum drying oven for drying;

step 3): anti-oxidation modification of the repair material comprising:

step 3.1): mixing and stirring evenly $Al_2O_3$, $B_2O_3$, $TiO_2$ and $ZrB_2$ powders to obtain mixed powders;

step 3.2): adding lithium tetraborate to a sodium silicate aqueous solution to obtain a first solution, and stirring the first solution to obtain a stable solution; then adding the mixed powders obtained in step 3.1) into the stable solution to obtain a second solution, and stirring the second solution to obtain a modifying solution;

step 3.3): pouring the modifying solution obtained in step 3.2) into an impregnating tank, completely submerging the repair material in the modifying solution, and then vacuumizing the impregnating tank to vacuum impregnate the modifying solution into the repair material and obtain an impregnated repair material; and step 3.4): drying the impregnated repair material, and then curing the impregnated repair material in an oven at 80-120° C. for 2-4 h;

step 4): bonding and curing comprising: applying an adhesive to the polished surface of the polished carbon brake disc and the bonding surface of the impregnated repair material, and bonding the impregnated repair material to the polished surface; clamping the polished carbon brake disc and the impregnated repair material by using a clamp, and removing a spilled excess of the adhesive; putting the polished carbon brake disc with the impregnated repair material into the oven for curing to form a bonded carbon brake disc; then removing a vacuum bag from the bonded carbon brake disc after curing, and polishing and smoothing a repair zone of the bonded carbon brake disc to obtain a smoothed carbon brake disc; and step 5): heat treatment comprising: placing the smoothed carbon brake disc obtained in step 4) into a pre-vacuumized pyrolysis furnace and filling the pyrolysis furnace with $N_2$ and heating to perform a heat preservation, and then cooling the smoothed carbon brake disc to room temperature within the pyrolysis furnace to obtain a repaired carbon brake disc.

2. The method according to claim 1, wherein in step 1), a slope of the slope shape is 1:15 to 1:20.

3. The method according to claim 1, wherein in step 3.1), before mixing, the $Al_2O_3$, $B_2O_3$, $TiO_2$ and $ZrB_2$ powders are respectively milled in a ball mill for 12 h, then sieved through a 325-mesh sieve, and dried in the oven at 120° C. for 6 h.

4. The method according to claim 1, wherein in step 3.1), the $Al_2O_3$, $B_2O_3$, $TiO_2$ and $ZrB_2$ powders have a weight ratio of 1:1.2:0.8:0.5.

5. The method according to claim 1, wherein in step 3.2), the mass of the lithium tetraborate is 1-6% of the mass of the sodium silicate aqueous solution, and the mass of the mixed powders are 10% of the mass of the sodium silicate aqueous solution.

6. The method according to claim 1, wherein in step 3.3), the vacuum impregnation is carried out under 40-60 kPa for 1-4 h.

7. The method according to claim 1, wherein in step 4), the adhesive is prepared as follows: mixing a resin in an organic solvent to obtain a third solution; then adding an inorganic filler, a catalyst and a curing agent into the third solution to obtain a fourth solution; and stirring the fourth solution to obtain the adhesive.

8. The method according to claim 7, wherein the resin is selected from the group consisting of an organic silicone resin, an epoxy resin, and combinations thereof; the inorganic filler is selected from the group consisting of aluminum, boron carbide, glass powder, and combinations thereof.

9. The method according to claim 1, wherein in step 4), the curing is carried out by heating for 3 h.

10. The method according to claim 1, wherein in step 5), the heat treatment in the pyrolysis furnace is carried out by heating to 700° C. and performing the heat preservation for 2 h.

* * * * *